United States Patent
Wang et al.

(10) Patent No.: US 11,513,260 B2
(45) Date of Patent: Nov. 29, 2022

(54) PROTECTIVE FILM FOR DISPLAY, PRODUCTION METHOD THEREOF, AND STRETCHABLE DISPLAY APPARATUS

(71) Applicant: BOE Technology Group Co., Ltd., Beijing (CN)

(72) Inventors: Hejin Wang, Beijing (CN); Mingche Hsieh, Beijing (CN); Pinfan Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 670 days.

(21) Appl. No.: 16/390,452

(22) Filed: Apr. 22, 2019

(65) Prior Publication Data

US 2020/0073020 A1    Mar. 5, 2020

(30) Foreign Application Priority Data

Aug. 31, 2018  (CN) .......................... 201811016452.3

(51) Int. Cl.

| | |
|---|---|
| *B32B 27/20* | (2006.01) |
| *B32B 27/30* | (2006.01) |
| *B32B 27/40* | (2006.01) |
| *C03C 17/32* | (2006.01) |
| *H05B 3/84* | (2006.01) |
| *G02B 1/14* | (2015.01) |
| *G06F 1/16* | (2006.01) |
| *B32B 27/28* | (2006.01) |

(52) U.S. Cl.
CPC ............... *G02B 1/14* (2015.01); *B32B 27/20* (2013.01); *B32B 27/283* (2013.01); *B32B 27/30* (2013.01); *B32B 27/40* (2013.01); *C03C 17/32* (2013.01); *G06F 1/1652* (2013.01); *H05B 3/84* (2013.01); *B32B 2274/00* (2013.01)

(58) Field of Classification Search
None
See application file for complete search history.

(56) References Cited

U.S. PATENT DOCUMENTS

| | | | |
|---|---|---|---|
| 8,399,567 B2 | 3/2013 | Chun et al. | |
| 10,578,773 B2 | 3/2020 | Kitayama et al. | |
| 2007/0109650 A1 * | 5/2007 | Yamada | G02B 1/11 359/589 |
| 2011/0269910 A1 | 11/2011 | Chun et al. | |
| 2012/0248381 A1 | 10/2012 | Saijo et al. | |
| 2014/0356599 A1 | 12/2014 | Hongo et al. | |
| 2017/0031058 A1 | 2/2017 | Kitayama et al. | |
| 2017/0162823 A1 | 6/2017 | Kim et al. | |
| 2017/0335136 A1 | 11/2017 | Lee | |

FOREIGN PATENT DOCUMENTS

| | | |
|---|---|---|
| CN | 102272640 A | 12/2011 |
| CN | 102731979 A | 10/2012 |
| CN | 103614067 A | 3/2014 |
| CN | 104210190 A | 12/2014 |
| CN | 104882071 A | 9/2015 |
| CN | 105764994 A | 7/2016 |
| CN | 106750431 A | 5/2017 |
| CN | 107402414 A | 11/2017 |
| CN | 107657895 A | 2/2018 |
| CN | 107741674 A | 2/2018 |
| JP | S60131712 A | 7/1985 |

OTHER PUBLICATIONS

First Office Action, including Search Report, for Chinese Patent Application No. 201811016452.3, dated May 7, 2020, 32 pages.
"Basic Membrane Separation Technique", Article, ISBN 7-5025-9023-4, dated Aug. 31, 2006, 6 pages.
"Polymer Physics", Article, ISBN 7-04-015846-9, dated Dec. 31, 2004, 8 pages.
Jian Dong et al., "Preparation and mechanical properties of polymethyl methacrylate reinforced polysilyl chloride elastomer", Article No. 1000-1255 (2008) 03-0205-04, dated May 15, 2008, 9 pages.

* cited by examiner

*Primary Examiner* — Sheeba Ahmed

(74) *Attorney, Agent, or Firm* — Westman, Champlin & Koehler, P.A.

(57) ABSTRACT

There are provided a protective film for display, a production method thereof, and a stretchable display apparatus. The protective film for display comprises: particles of a transparent resin, and a matrix of a transparent elastomer having an elastic modulus lower than that of the transparent resin, wherein the particles of the transparent resin are distributed in the matrix of the transparent elastomer, and when the protective film for display is stretched to reach a critical elongation, a craze occurs in the protective film for display.

17 Claims, 2 Drawing Sheets

PROTECTIVE FILM FOR DISPLAY, PRODUCTION METHOD THEREOF, AND STRETCHABLE DISPLAY APPARATUS

CROSS-REFERENCE TO RELATED APPLICATION

This disclosure claims the priority of Chinese Patent Application No. 201811016452.3 filed on Aug. 31, 2018, which is incorporated herein in its entirety by reference.

TECHNICAL FIELD

This disclosure relates to the field of flexible display. Particularly, this disclosure relates to a protective film for display, a production method thereof, and a stretchable display apparatus.

BACKGROUND ART

The flexible display screen is a display device which may be arbitrarily bended, folded, and stretched, and has the advantages of good lightness and thinness, small volume, low energy consumption, high portability, and the like. The flexible display screen can retain a relatively high resolution while being stretched. The flexible display screen which allows for stretchable display may be used in wearable devices, devices for Internet of Things, automobiles, artificial intelligence, and the like.

The substrate of the stretchable display apparatus is typically a polymer material. Stretching is achieved by the elasticity of the polymer material itself. As the stretching strain increases, the molecular chain of the polymer material tends to be linear. After the stretching strain increases to a certain extent, an inflection point occurs, the stress rapidly increases, and the display screen is damaged. During practical use, the strain of the stretchable display apparatus should be prevented from reaching the failure strain.

In order to prevent the strain of the stretchable display apparatus from reaching the failure strain, a protective apparatus having a metal mechanical structure may be used to limit the deformation amount of the stretchable display apparatus. However, it has the disadvantages of high cost and large thickness.

Therefore, there are needs for a protect apparatus for controlling the deformation amount of a stretchable display apparatus, a production method thereof, and a stretchable display apparatus.

SUMMARY OF THE INVENTION

In one aspect, this disclosure provides a protective film for display, comprising:
particles of a transparent resin, and
a matrix of a transparent elastomer having an elastic modulus lower than that of the transparent resin,
wherein the particles of the transparent resin are distributed in the matrix of the transparent elastomer, and
when the protective film for display is stretched to reach a critical elongation, a craze occurs in the protective film for display.

According to one embodiment of this disclosure, the critical elongation is 5% to 150%.

According to another embodiment of this disclosure, the particle of the transparent resin has a glass transition temperature of 25° C. to 110° C.

According to another embodiment of this disclosure, a weight ratio of the particles of the transparent resin to the matrix of the transparent elastomer is 5:95 to 50:50.

According to another embodiment of this disclosure, the particle of the transparent resin has an average particle diameter of 0.01 μm to 3 μm.

According to another embodiment of this disclosure, the particle of the transparent resin is selected from at least one of polyacrylates and polymethacrylates.

According to another embodiment of this disclosure, the transparent resin is selected from at least one of poly(methyl methacrylate), poly(tert-butyl acrylate), poly(n-propyl methacrylate), poly(ethyl methacrylate), poly(isobutyl methacrylate), poly(hydroxyethyl methacrylate), and poly (glycidyl methacrylate).

According to another embodiment of this disclosure, the transparent elastomer is selected from at least one of polydimethylsiloxanes and thermoplastic polyurethanes.

According to another embodiment of this disclosure, the protective film for display further comprises: an interfacial compatibilizer.

According to another embodiment of this disclosure, the interfacial compatibilizer comprises at least one of nanosilica and nanoalumina.

According to another embodiment of this disclosure, the interfacial compatibilizer has a weight content of 0.01% to 10% in the protective film for display.

According to another embodiment of this disclosure, the protective film for display has a thickness of 25 μm to 1000 μm.

According to another embodiment of this disclosure, the particles of the transparent resin are uniformly distributed in the matrix of the transparent elastomer.

In another aspect, this disclosure provides a method of producing the protective film for display of any one described above, comprising:
extruding a mixture of the particles of the transparent resin and the matrix of the transparent elastomer in a form of a film at a temperature no less than a melting temperature of the mixture.

In still another aspect, this disclosure provides a stretchable display apparatus, comprising the protective film for display of any one described above.

According to one embodiment of this disclosure, the stretchable display apparatus comprises a stretchable substrate, wherein the critical elongation is less than an elongation corresponding to a transition strain point of the stretchable substrate.

According to another embodiment of this disclosure, the critical elongation is 90% or less of an elongation corresponding to a transition strain point of the stretchable substrate.

According to another embodiment of this disclosure, the stretchable display apparatus further comprises:
a stretchable display device; and
an electric heating layer;
wherein the electric heating layer is located between the protective film for display and the stretchable display device and is capable of heating the protective film for display to a temperature no less than a glass transition temperature of the transparent resin.

DESCRIPTION OF DRAWINGS

In order to illustrate the technical solutions in Examples of this disclosure more clearly, figures required for describing the Examples will be simply introduced below. It is apparent that the figures described below are merely exemplary Examples of this disclosure, and other figures may be further obtained by those of ordinary skill in the art according to these figures without exerting inventive work.

DESCRIPTION OF EMBODIMENTS

The technical solutions in the Examples of this disclosure will be described clearly and fully below in conjunction with specific embodiments of this disclosure. Obviously, the embodiments and/or Examples described are merely a part of the embodiments and/or Examples of this disclosure, rather than all of the embodiments and/or Examples. Based on the embodiments and/or Examples of this disclosure, all other embodiments and/or Examples obtained by those of ordinary skill in the art without performing inventive work belong to the scope protected by this disclosure.

In this disclosure, the layer and the film may be interchangeably used, unless specifically indicated. In this disclosure, all characteristics of numeric values mean to be within an error range of measurement, for example within ±10%, within ±5%, or within ±1% of a defined numeric value. Terms "first", "second", and the like are for the purpose of description only, and cannot be understood as indicating or suggesting relative importance or implying the number of technical features indicated. Thereby, a characteristic defined by "first", "second", and the like may expressly or impliedly comprises one or more characteristics.

The substrate of the stretchable display apparatus is typically a polymer material. Stretching is achieved by the elasticity of the polymer material itself and the patterning of the substrate.

Figure 1:
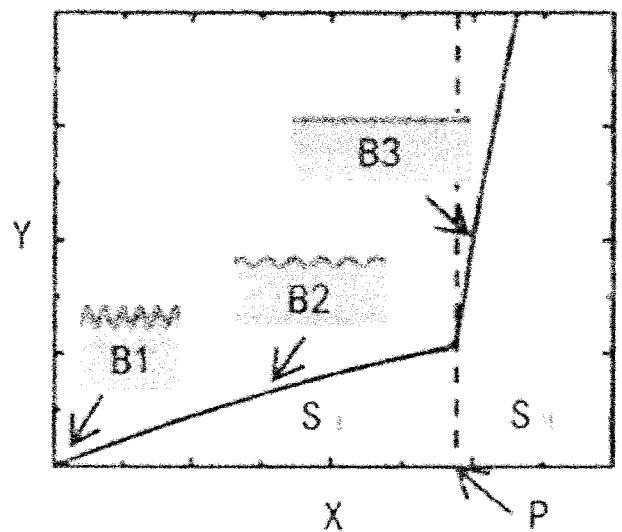
FIG. 1 is a diagram exemplarily illustrating a strain-stress curve of a stretchable substrate.

FIG. 1 is a diagram exemplarily illustrating a strain-stress curve of a stretchable substrate. In FIG. 1, the abscissa X represents strain, and the ordinate Y represents stress.

As shown in FIG. 1, the stress to which an unstretched stretchable substrate is subjected is 0, and thus the strain is also 0. A patterned stretchable substrate is a stretchable substrate in which the molecular weight is still in a contraction state. At this time, the stretchable substrate is as shown by the stretchable substrate B1 in FIG. 1. When the stretchable substrate is stretched to an extent where the transition strain point is not exceeded, the stretching is at stage I, $S_I$. The stretchable substrate is subjected to stress to generate strain. The patterned stretchable substrate is elongated due to stretching, and the molecular chain of the polymer material tends to be linear. At this time, the stretchable substrate is as shown by the stretchable substrate B2 in FIG. 1. After the stretching strain increases to a certain extent, an inflection point occurs on the strain-stress curve (the corresponding abscissa thereof, i.e., strain or elongation, is point P in the diagram). In other words, the transition strain point refers to a place where the slope of the strain-stress curve abruptly rises, and corresponds to a state where the molecular chain is substantially straightened microscopically. After the curve exceeds the transition strain point, the molecular chain of the polymer material becomes linear and the stretching is at stage II, $S_{II}$. The stretchable substrate is as shown by the stretchable substrate B3 in FIG. 1. The slope of the strain-stress curve of stage II, $S_{II}$, is much higher than the slope of the strain-stress curve of stage I, $S_I$. At this time, the molecular chain of the polymer material is at a straightened state, the elastic coefficient greatly increases, the ductility of the material is deteriorated, and breakage and damage tend to occur.

When a stretchable display apparatus is stretched, as the stretching strain increases, the molecular chain of the polymer material tends to be linear. After the stretching strain increases to a certain extent, an inflection point occurs, the stress rapidly increases, and the display screen is damaged. During practical use, the strain of the stretchable display apparatus should be prevented from reaching the failure strain.

Through intensive and detailed studies, the inventor of this disclosure has found that the particles of the transparent resin in the protective film for display are uniformly distributed in the matrix of the transparent elastomer to form a sea-island structure. By comprising the protective film for display in a stretchable apparatus, crazes are generated in island phases in the protective film when the stretchable display apparatus is stretched to a set extent so that the transparency changes, and the user is reminded to stop stretching. The stretchable display may be effectively prevented from permanent damage due to excessively large stretching strain. Furthermore, by heating the protective film for display to a temperature no less than the glass transition temperature of the transparent resin, the crazes may be self-repaired, and therefore the protective film for display may be recovered to a transparent state.

In one aspect, this disclosure may provide a protective film for display, comprising:

particles of a transparent resin, and a matrix of a transparent elastomer having an elastic modulus lower than that of the transparent resin, wherein the particles of the transparent resin are distributed in the matrix of the transparent elastomer, and when the protective film for display is stretched to reach a critical elongation, a craze occurs in the protective film for display.

The phenomenon of craze is a defect of a polymer having a microcrack-like shape caused under the action of solvent, ultraviolet light, mechanical force, internal stress, and the like. The craze exhibits a silvery white gloss under irradiation of light and is composed of a craze matter (a highly oriented polymer microfiber) and a cavity. The craze matter is connected to a craze edge in the cavity. The craze matter has certain mechanical strength and viscoelasticity and therefore can withstand a certain load. Additionally, crazes can spontaneously disappear at a temperature no less than the glass transition temperature of the polymer, which is referred to as self repairing.

Figure 2:
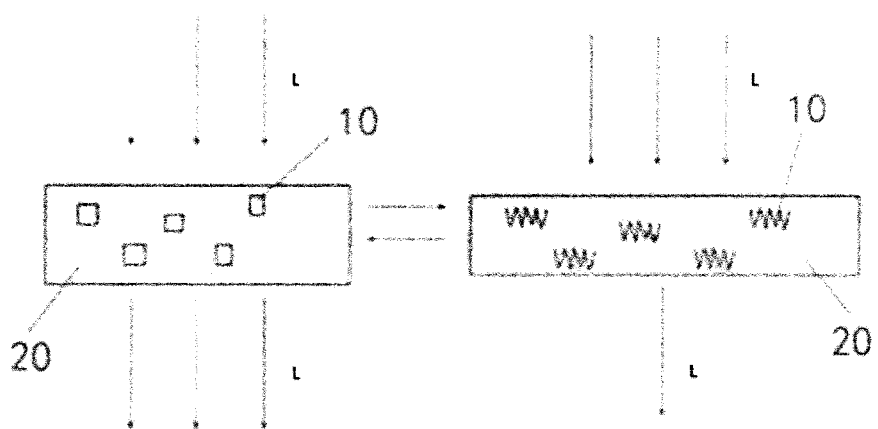
FIG. 2 is a schematic diagram exemplarily illustrating the protection principle of a stretchable protective film for display according to one embodiment of this disclosure.

FIG. 2 is a schematic diagram exemplarily illustrating the protection principle of a stretchable protective film for display according to one embodiment of this disclosure.

As shown in FIG. 2, light L may pass through the protective film for display of this disclosure. The protective film for display may comprise particles 10 of a transparent resin and a matrix 20 of a transparent elastomer. The particles 10 of the transparent resin are distributed in the matrix 20 of the transparent elastomer. That is, the particles 10 of the transparent resin are distributed in the matrix 20 of the transparent elastomer to form a sea-island structure. A sea phase is the matrix 20 of the transparent elastomer, and island phases are the particles 20 of the transparent resin. Preferably, the particles of the transparent resin are uniformly distributed in the matrix of the transparent elastomer.

The elastic modulus of the transparent elastomer is lower than that of the transparent resin. In other words, hard particles of the transparent resin are distributed in the soft transparent elastomer. The resin may be also referred to as a plastic. Upon stretching, the protective film for display is subjected to stress. Crazes are generated in island phases (i.e., particles 10 of the transparent resin) in the protective film when the stretchable display apparatus is stretched to a set extent (i.e., the one in the left panel in FIG. 2 is stretched to be the one in the right panel) so that the transparency changes. The light transmitted through the protective film is reduced. That is, the protective film for display is changed from being transparent to exhibiting a silvery white gloss. Furthermore, by heating the protective film for display to a temperature no less than the glass transition temperature of the transparent resin, the crazes may be self-repaired, and therefore the protective film for display may be recovered to a transparent state. Furthermore, by heating the protective film for display to a temperature no less than the glass transition temperature of the transparent resin and cancelling the stretching of the protective film for display, or by heating to a temperature no less than the glass transition temperature of the transparent resin and compressing the protective film for display, the crazes may be self-repaired while the protective film for display may be recovered to an original unstretched transparent state (i.e., the one in the right panel in FIG. 2 is recovered to the one in the left panel by heating and compressing or heating and cancelling stretching). That is, the protective film for display according to this disclosure may be reversibly changed between an unstretched state and a state where a craze occurs after stretching.

By selecting materials of the particles of the transparent resin and the matrix of the transparent elastomer and the mixing ratio thereof, the elongation of the protective film for display when a craze occurs upon stretching may be adjusted.

The elastic modulus of the transparent resin is typically on the order of GPa. Furthermore, the elastic modulus of the transparent elastomer is typically on the order of MPa, and the difference is three orders of magnitude. The modulus is the ability to resist deformation. By applying the same stress, the deformation of the transparent resin plastic is smaller than that of the matrix of the transparent elastomer. Therefore, it is considered that the plastic particle is hard and the elastomer matrix is soft.

The protective film for display according to this disclosure may be used as the protective film of a stretchable display apparatus. By comprising the protective film for display in a stretchable apparatus, crazes are generated in island phases in the protective film when the stretchable display apparatus is stretched to a set extent so that the transparency changes, and the user is reminded to stop stretching. Therefore, the elongation of the protective film for display when a craze occurs upon stretching should be less than the elongation corresponding to the transition strain point of the stretchable substrate. As described above, by selecting materials of the particles of the transparent resin and the matrix of the transparent elastomer and the mixing ratio thereof, the elongation of the protective film for display when a craze occurs upon stretching may be adjusted. Therefore, when the elongation corresponding to the transition strain point of the stretchable substrate is relatively small, a protective film for display having a relatively small elongation when a craze occurs upon stretching is selected; and when the elongation corresponding to the transition strain point of the stretchable substrate is relatively large, a protective film for display having a relatively large elongation when a craze occurs upon stretching is selected. Typically, the elongation of the protective film for display when a craze occurs upon stretching may be adjusted in a range of about 5% to about 150%.

According to this disclosure, the elongation refers to a ratio of the difference between the length after stretching and the length before stretching to the length before stretching. For example, the elongation of the protective film for display when a craze occurs upon stretching is also referred to as a critical elongation, which refers to a ratio of the difference between the length of the protective film for display in the direction of stretching when a craze occurs upon stretching and the length of the protective film for display in the direction of stretching before stretching to the length of the protective film for display in the direction of stretching before stretching. The elongation corresponding to the transition strain point of the stretchable substrate refers to a ratio of the difference between the length of the stretchable substrate in the direction of stretching when a transition strain point occurs upon stretching and the length of the stretchable substrate in the direction of stretching before stretching to the length of the stretchable substrate in the direction of stretching before stretching.

The weight ratio of the particles of the transparent resin to the matrix of the transparent elastomer may be about 5:95 to about 50:50. The sea phase in the sea-island structure may prevent crazes from being converted to cracks. After cracks are formed, the protective film for display cannot be recovered to a transparent state. Therefore, the weight ratio of the particles of the transparent resin to the matrix of the transparent elastomer should not be greater than about 50:50. On the other hand, an excessively low weight ratio of the particles of the transparent resin to the matrix of the transparent elastomer may be disadvantageous to finding of crazes after they occur. Therefore, the weight ratio of the particles of the transparent resin to the matrix of the transparent elastomer should not be less than about 5:95.

As described above, crazes can spontaneously disappear at a temperature no less than the glass transition temperature of the polymer. Therefore, in order to be useful in a stretchable display apparatus, the glass transition temperature of the transparent resin may be about 25° C. to about 110° C., for example about 25° C. to about 70° C. In the case where the glass transition temperature of the transparent resin is in this range, the stretchable display apparatus will not be damaged due to heating when the protective film for display is heated to allow crazes to be self-repaired.

Typically, the average particle diameter of the particle of the transparent resin may be about 0.01 μm to about 3 μm.

Examples of the transparent resin may include polyacrylates and polymethacrylates. Polyacrylates and polymethacrylates may include homopolymers or copolymers of polyacrylates and polymethacrylates, for example at least one of poly(methyl methacrylate), poly(tert-butyl acrylate), poly(n-propyl methacrylate), poly(ethyl methacrylate), poly(isobutyl methacrylate), poly(hydroxyethyl methacrylate), and poly(glycidyl methacrylate); and copolymers of two or more acrylates or methacrylates, or copolymers of acrylates or methacrylates and other monomers.

Copolymers of acrylates or methacrylates may be obtained by copolymerization of two or more acrylates or methacrylate or copolymerization of acrylates or methacrylates and other monomers. With respect to homopolymers of acrylates or methacrylates, copolymers of acrylates or methacrylates may have increased or reduced glass transition temperatures so that the glass transition temperature of the transparent resin may be adjusted.

Examples of other monomers which may be copolymerized with acrylates or methacrylates may include further acrylic compounds such as acrylic acid and methacrylic acid and another acrylate or methacrylate, and other unsaturated compounds having a carbon-carbon double bond such as styrene, acrylonitrile, ethyl acetate, vinyl chloride, and the like.

For example, copolymers of two or more acrylates or methacrylates may include copolymers of two or more following monomers: methyl acrylate, ethyl acrylate, propyl acrylate, butyl acrylate, hexyl acrylate, methyl methacrylate, ethyl methacrylate, propyl methacrylate, butyl methacrylate, hexyl methacrylate, hydroxymethyl acrylate, hydroxyethyl acrylate, hydroxypropyl acrylate, hydroxymethyl methacrylate, hydroxyethyl methacrylate, and hydroxypropyl methacrylate.

For example, copolymers of polyacrylates or polymethacrylates and other monomers may include poly((meth) acrylic acid-$C_1$-$C_6$ alkyl (meth)acrylate), poly($C_1$-$C_6$ alkyl (meth)acrylate-styrene), poly($C_1$-$C_6$ alkyl (meth) acrylate-acrylonitrile), poly(hydroxy $C_1$-$C_6$ alkyl (meth) acrylate-acrylonitrile), and poly((meth) acrylic acid-$C_1$-$C_6$ alkyl (meth) acrylate-styrene).

The term "(meth)acrylic acid" refers to acrylic acid and/or methacrylic acid.

The glass transition temperatures of copolymers of acrylates or methacrylates may be controlled by adjusting the type and the content of the comonomer.

Among these, for example, the glass transition temperature of poly(methyl methacrylate) is 104° C. The glass transition temperature of poly(tert-butyl acrylate) is 41° C. The glass transition temperature of poly(n-propyl methacrylate) is 33° C. The glass transition temperature of poly(ethyl methacrylate) is 65° C. The glass transition temperature of poly(isobutyl methacrylate) is 48° C. The glass transition temperature of poly(hydroxyethyl methacrylate) is 55° C. The glass transition temperature of poly(glycidyl methacrylate) is 46° C.

Examples of the transparent elastomer may include polydimethylsiloxanes, thermoplastic polyurethanes, and mixtures thereof.

In the protective film for display according to this disclosure, an interface is present between the particle of the transparent resin and the matrix of the transparent elastomer. In order to improve the compatibility of the interface between the particle of the transparent resin and the matrix of the transparent elastomer, the protective film for display according to this disclosure may also comprise an interfacial compatibilizer.

Examples of the interfacial compatibilizer may include nanosilica, nanoalumina, and a mixture thereof.

In order to further achieve the effect of the compatibility of the interface, the weight content of the interfacial compatibilizer in the protective film for display may be about 0.01% to about 10%.

According to this disclosure, the thickness of the protective film for display may be about 25 µm to about 1000 µm. The thickness is typically about 25 µm or more to ensure a basic mechanical strength, and the thickness is not required to be excessively large and is typically about 1000 µm or less.

According to this disclosure, a protective film for display may be produced by extruding a mixture of particles of a transparent resin, a matrix of a transparent elastomer, and an optional interfacial compatibilizer in a form of a film at a temperature no less than a melting temperature of the mixture, wherein the elongation of the protective film for display when a craze occurs upon stretching is greater than 0. The protective film for display is attached onto a light emergent surface of a stretchable display device comprising a stretchable substrate to provide a protective effect.

Therefore, according to this disclosure, there may also provide a stretchable display apparatus, comprising the protective film for display of any one described above.

The stretchable display apparatus comprises a stretchable substrate. As described above, by comprising the protective film for display in a stretchable apparatus, crazes are generated in island phases in the protective film when the stretchable display apparatus is stretched to a set extent so that the transparency changes, and the user is reminded to stop stretching. The stretchable display is effectively prevented from permanent damage due to excessively large stretching strain.

Therefore, the elongation of the protective film for display when a craze occurs upon stretching is less than the elongation corresponding to the transition strain point of the stretchable substrate. For example, the elongation of the protective film for display when a craze occurs upon stretching may be about 90% or less of the elongation corresponding to the transition strain point of the stretchable substrate.

As described above, crazes can spontaneously disappear at a temperature no less than the glass transition temperature of the polymer. Therefore, after crazes are generated in island phases in the protective film when the stretchable display apparatus is stretched to a set extent, the protective film for display may be heated to a temperature no less than the glass transition temperature of the transparent resin so that the crazes spontaneously disappear, i.e., are self-repaired, and are recovered to a transparent state. The stretchable display apparatus may be placed in an environment higher than or equal to the glass transition temperature of the transparent resin thereof, for example in the sun or in a temperature-controllable heating chamber, so that the crazes spontaneously disappear.

As an option, the stretchable display apparatus may also comprise an electric heating layer.

Figure 3:
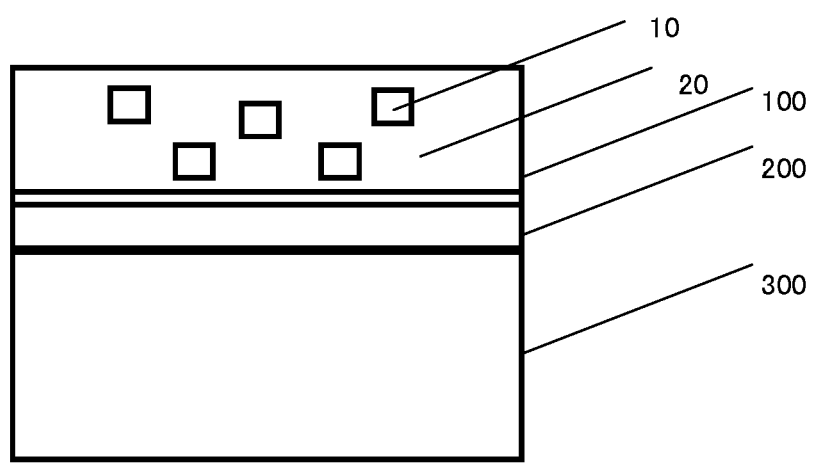
FIG. 3 is a schematic diagram exemplarily illustrating a stretchable display apparatus according to one embodiment of this disclosure.

FIG. 3 is a schematic diagram exemplarily illustrating a stretchable display apparatus according to one embodiment of this disclosure.

As shown in FIG. 3, the stretchable display apparatus may also comprise: a protective film for display 100, an electric heating layer 200, and a stretchable display device 300 comprising a stretchable substrate. The electric heating layer 200 may be located between the protective film for display 100 and the stretchable display device 300. The electric heating layer 200 may be used to heat the protective film for display 100 to a temperature no less than the glass transition temperature of the transparent resin in the particles 10 of the transparent resin distributed in the matrix 20 of the transparent elastomer to allow crazes to be self-repaired after a craze occurs upon stretching of the protective film for display 100.

EXAMPLES

Technical solutions of this disclosure will be further illustrated by specific Examples below. However, these Examples are merely for the purpose of illustrating this disclosure, and should not be construed as limiting this disclosure.

Materials

Poly(methyl methacrylate): model GF-1000, available from Kuraray, Japan

Polydimethylsiloxane: model MB 50-001, available from Dow Corning

Nanosilica: Aerosil 200, average particle diameter of 12 nm, available from Evonik Example 1

Poly(methyl methacrylate) and polydimethylsiloxane were mixed at a weight ratio of 30/70 to obtain a mixture. The mixture was heated to 140° C. and physically blended in a blender, and extruded in a form of a film with a mold and cooled to form a film having a thickness of 100 μm so as to obtain a protective film for display of Example 1, wherein conditions of blending were adjusted so that the average particle diameter of poly(methyl methacrylate) particles in the protective film for display of Example 1 was 0.3 μm.

The elongation of the protective film for display of Example 1 when a craze occurred upon stretching was 42%. The protective film for display after a craze occurred upon stretching was surface-heated to 110° C., so that the crazes were self-repaired.

Example 2

A protective film for display of Example 2 was prepared in the same manner as that of Example 1, except that the weight ratio of poly(methyl methacrylate) to polydimethylsiloxane was changed from 30/70 to 10/90, and conditions of blending were changed so that the average particle diameter of poly(methyl methacrylate) particles in the protective film for display of Example 2 was 0.08 μm.

The elongation of the protective film for display of Example 2 when a craze occurred upon stretching was 115%. The protective film for display after a craze occurred upon stretching was surface-heated to 110° C., so that the crazes were self-repaired.

Example 3

A protective film for display of Example 3 was prepared in the same manner as that of Example 1, except that 5 wt % of nanosilica was added to the mixture, and conditions of blending were changed so that the average particle diameter of poly(methyl methacrylate) particles in the protective film for display of Example 3 was 0.2 μm.

The elongation of the protective film for display of Example 3 when a craze occurred upon stretching was 35%. The protective film for display after a craze occurred upon stretching was placed in an environment at 110° C., so that the crazes were self-repaired.

By comparing the protective film for display of Example 3 to the protective film for display of Example 1, it was observed that the compatibility of the interface between the poly(methyl methacrylate) particles and the polydimethylsiloxane matrix was improved, the phenomenon of agglomeration of poly(methyl methacrylate) was reduced, dispersion particle sizes were more uniform, the phenomenon of crazes will be easily induced by stress, and the elongation corresponding to the occurrence of the phenomenon of crazes was reduced.

Example 4

A protective film for display of Example 4 was prepared in the same manner as that of Example 1, except that poly(methyl methacrylate) was replaced by ethyl methacrylate.

The elongation of the protective film for display of Example 4 when a craze occurred upon stretching was 42%. The protective film for display after a craze occurred upon stretching was surface-heated to 70° C., so that the crazes were self-repaired.

Example 5

A protective film for display of Example 5 was prepared in the same manner as that of Example 2, except that poly(methyl methacrylate) was replaced by ethyl methacrylate.

The elongation of the protective film for display of Example 5 when a craze occurred upon stretching was 115%. The protective film for display after a craze occurred upon stretching was surface-heated to 70° C., so that the crazes were self-repaired.

Example 6

A protective film for display of Example 6 was prepared in the same manner as that of Example 3, except that poly(methyl methacrylate) was replaced by ethyl methacrylate.

The elongation of the protective film for display of Example 6 when a craze occurred upon stretching was 35%. The protective film for display after a craze occurred upon stretching was surface-heated to 70° C., so that the crazes were self-repaired.

By comparing the protective film for display of Example 6 to the protective film for display of Example 4, it was observed that the compatibility of the interface between the poly(ethyl methacrylate) particles and the polydimethylsiloxane matrix was improved, the phenomenon of agglomeration of poly(ethyl methacrylate) was reduced, dispersion particle sizes were more uniform, the phenomenon of crazes will be easily induced by stress, and the elongation corresponding to the occurrence of the phenomenon of crazes was reduced.

Therefore, according to this disclosure, the particles of the transparent resin in the protective film for display are uniformly distributed in the matrix of the transparent elastomer to form a sea-island structure. By comprising the protective film for display in a stretchable apparatus, crazes are generated in island phases in the protective film when the stretchable display apparatus is stretched to a set extent so that the transparency changes, and the user is reminded to stop stretching. The stretchable display is effectively prevented from permanent damage due to excessively large stretching strain. Furthermore, by heating the protective film for display to a temperature no less than the glass transition temperature of the transparent resin, the crazes may be self-repaired, and therefore the protective film for display may be recovered to a transparent state. Furthermore, by heating the protective film for display to a temperature no less than the glass transition temperature of the transparent resin and compressing the protective film for display, the crazes may be self-repaired while the protective film for display may be recovered to an original unstretched transparent state.

Obviously, various modifications and variations may be made to the Examples of this disclosure by the person skilled in the art without deviating from the spirit and the scope of this disclosure. Thus, if these modifications and variations of this disclosure are within the scope of the claims of this disclosure and equivalent techniques thereof, this disclosure also intends to encompass these modifications and variations.

What is claimed is:

1. A protective film for display, comprising:
   particles of a transparent resin, wherein the transparent resin is selected from at least one of polyacrylates and polymethacrylates, and
   a matrix of a transparent elastomer having an elastic modulus lower than that of the transparent resin, wherein the transparent elastomer is selected from at least one of polydimethylsiloxanes and thermoplastic polyurethanes,
   wherein the particles of the transparent resin are distributed in the matrix of the transparent elastomer, and
   when the protective film for display is stretched to reach a critical elongation, a craze occurs in the protective film for display, so that transparency changes,
   wherein
   when the protective film for display is not stretched to reach the critical elongation, the protective film for display is in a transparent status, wherein the transparency is not changed;
   when the protective film for display is stretched to reach the critical elongation, the craze occurs in the protective film for display, so that the transparency decreases; and
   after the craze occurs in the protective film for display due to that the critical elongation is reached, when the protective film for display is heated to a temperature no less than a glass transition temperature of the transparent resin, the craze disappears and the protective film for display is in a transparent status again.

2. The protective film for display of claim 1, wherein the critical elongation is 5% to 150%.

3. The protective film for display of claim 1, wherein the transparent resin has a glass transition temperature of 25° C. to 110° C.

4. The protective film for display of claim 1, wherein a weight ratio of the particles of the transparent resin to the matrix of the transparent elastomer is 5:95 to 50:50.

5. The protective film for display of claim 1, wherein the particle of the transparent resin has an average particle diameter of 0.01µm to 3 µm.

6. The protective film for display of claim 1, wherein the transparent resin is selected from at least one of poly(methyl methacrylate), poly(tert-butyl acrylate), poly(n-propyl methacrylate), poly(ethyl methacrylate), poly(isobutyl methacrylate), poly(hydroxyethyl methacrylate), and poly(glycidyl methacrylate).

7. The protective film for display of claim 1, further comprising: an interfacial compatibilizer.

8. The protective film for display of claim 7, wherein the interfacial compatibilizer comprises at least one of nanosilica and nanoalumina.

9. The protective film for display of claim 7, wherein the interfacial compatibilizer has a weight content of 0.01% to 10% in the protective film for display.

10. The protective film for display of claim 1, wherein the protective film for display has a thickness of 25 µm to 1000 µm.

11. The protective film for display of claim 1, wherein the particles of the transparent resin are uniformly distributed in the matrix of the transparent elastomer.

12. A method of producing the protective film for display of claim 1, comprising:
    extruding a mixture of the particles of the transparent resin and the matrix of the transparent elastomer in a form of a film at a temperature no less than a melting temperature of the mixture.

13. A stretchable display apparatus, comprising the protective film for display of claim 1.

14. The stretchable display apparatus of claim 13, wherein the stretchable display apparatus comprises a stretchable substrate, wherein the critical elongation is less than an elongation corresponding to a transition strain point of the stretchable substrate.

15. The stretchable display apparatus of claim 14, wherein the critical elongation is 90% or less of an elongation corresponding to a transition strain point of the stretchable substrate.

16. The stretchable display apparatus of claim 13, further comprising:
    a stretchable display device; and
    an electric heating layer;
    wherein the electric heating layer is located between the protective film for display and the stretchable display device and is capable of heating the protective film for display to a temperature no less than a glass transition temperature of the transparent resin.

17. The protective film for display of claim 1, wherein the particles of the transparent resin are distributed in the matrix of the transparent elastomer to form a sea-island structure, wherein the sea phase is the matrix of the transparent elastomer, and island phases are the particles of the transparent resin, wherein crazes are generated in island phases, when the protective film for display is stretched to reach the critical elongation.

* * * * *